(12) United States Patent
Haering et al.

(10) Patent No.: US 7,917,280 B2
(45) Date of Patent: Mar. 29, 2011

(54) METHOD AND DEVICE FOR OPERATING AN INTERNAL COMBUSTION ENGINE

(75) Inventors: Juergen Haering, Stuttgart (DE); Wolfgang Fischer, Gerlingen (DE); Roland Karrelmeyer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 12/293,396

(22) PCT Filed: Feb. 12, 2007

(86) PCT No.: PCT/EP2007/051324
§ 371 (c)(1),
(2), (4) Date: Nov. 18, 2008

(87) PCT Pub. No.: WO2007/107412
PCT Pub. Date: Sep. 27, 2007

(65) Prior Publication Data
US 2009/0105930 A1   Apr. 23, 2009

(30) Foreign Application Priority Data
Mar. 17, 2006 (DE) .......................... 10 2006 012 746

(51) Int. Cl.
*F02M 25/07* (2006.01)
*B60T 7/12* (2006.01)
*G06F 17/00* (2006.01)

(52) U.S. Cl. ........ 701/103; 701/104; 701/108; 701/105; 701/102; 123/295; 123/299; 123/300; 123/304; 123/305; 123/568.14

(58) Field of Classification Search .................. 701/108, 701/111, 115, 102, 103, 104, 105, 106; 123/298, 123/296, 299, 300, 305, 568.11, 568.12, 123/568.13, 568.14, 568.21, 568.24, 568.25, 123/568.26, 568.27, 295, 297, 304
See application file for complete search history.

(56) References Cited

U.S. PATENT DOCUMENTS

| | | | | |
|---|---|---|---|---|
| 5,975,045 A * | 11/1999 | Mizuno | ......................... | 123/295 |
| 5,979,396 A * | 11/1999 | Yasuoka | ....................... | 123/295 |
| 6,196,183 B1 * | 3/2001 | Bauer et al. | ................... | 123/295 |
| 6,390,054 B1 | 5/2002 | Yang | | |
| 6,510,835 B1 * | 1/2003 | Mizuno et al. | ................ | 123/295 |
| 6,623,401 B2 * | 9/2003 | Idogawa et al. | ................. | 477/54 |
| 7,380,540 B1 * | 6/2008 | Duffy et al. | ................... | 123/435 |
| 7,680,584 B2 * | 3/2010 | Karrelmeyer et al. | ........ | 701/105 |

FOREIGN PATENT DOCUMENTS

| | | |
|---|---|---|
| DE | 42 07 541 | 9/1993 |
| DE | 102 33 612 | 2/2004 |
| EP | 0 957 253 | 11/1999 |
| JP | 2003-293863 | 10/2003 |
| JP | 2004-218500 | 8/2004 |

* cited by examiner

*Primary Examiner* — Stephen K Cronin
*Assistant Examiner* — Raza Najmuddin
(74) *Attorney, Agent, or Firm* — Merchant & Gould P.C.

(57) ABSTRACT

In order to operate an internal combustion engine, a fresh-air quantity, a residual-gas quantity and a fuel quantity are provided as a function of a load demand. During a change of load from a first to a second load demand, provision is made for the residual-gas quantity to first be provided according to the first load demand and for the fuel quantity to first be provided according to the second load demand.

4 Claims, 1 Drawing Sheet

METHOD AND DEVICE FOR OPERATING AN INTERNAL COMBUSTION ENGINE

TECHNICAL FIELD

The invention is based on a method and a device for operating an internal combustion engine according to the class of the independent claims.

BACKGROUND

Internal combustion engines are fundamentally known, in which gasoline is directly injected into the combustion chamber and, similar to a diesel internal combustion engine, is self ignited. Additional savings with regard to fuel consumption and once again a more favorable emissions behavior than is the case for internal combustion engines with an externally-supplied ignition via a spark plug can be expected from the self-ignition mode of operation of gasoline engines.

A homogenous self-ignition is thereby achieved in a gasoline engine, in that a significant proportion of the combusted air-fuel mixture is not discharged into the exhaust system but remains in the combustion chamber (so-called internal exhaust gas recirculation). The combusted air-fuel mixture is subsequently referred to as residual gas (RG). In the case of an internal exhaust gas recirculation, residual gas is either kept in the combustion chamber by means of a variable activation of the intake and exhaust valves in the gas exchange-TDC (negative valve overlap), or the residual gas is drawn back out of the exhaust gas port or the inlet port (positive valve overlap).

During the subsequent intake stroke, the residual gas is mixed with combustion air and fuel. In so doing, the fuel mixture situated in the combustion chamber at the point in time of the closing of the one or multiple intake valves, consisting of combustion air and residual gas, has a significantly increased temperature when compared to the normal operation. As a result of the compression of the fuel mixture situated in the combustion chamber, which occurs directly after the intake stroke, the temperature of said fuel mixture increases to such an extent that the fuel-air mixture situated in the combustion chamber ignites without an externally-supplied ignition via a spark plug. It is the goal of the homogenous self-ignition mode of operation that the self-ignition of the fuel-air mixture situated in the combustion chamber approximately takes place when the ignition TDC is achieved.

The residual gas has two important tasks in the process. The hot residual gas first of all provides heat, which in conjunction with the temperature increase during the compression stroke makes a self-ignition of the fuel-air mixture possible.

The second task of the residual gas consists of slowing down the kinetics of the combustion set into motion by the self-ignition. This foremost reduces the mechanical stress on the internal combustion engine and also reduces the engine's noise and prevents the emergence of regional temperature peaks. As a result of this action, an improvement in the degree of efficiency of the internal combustion engine is achieved; and due to the reduced maximum temperatures, an operation of the internal combustion engine, which is very low in NOx content and even partially free of NOx, is made possible.

Such methods are, for example, known from the German patent DE 102 33 612 A1.

The mass of residual gas required for self-ignition increases at low load points/load demands because the exhaust gas temperature drops due to the smaller combusted fuel mass. At higher load demands, a smaller mass of residual gas is required because the exhaust gases are hotter. The temperature of the mass of residual gas remaining in the cylinder, which is load dependant, leads to misfires in the dynamic operation during the change from low to higher loads; while during the change from high to low loads, early combustions occur.

SUMMARY

The method according to the invention with the characteristics of the independent claim has in contrast the advantage; in that during a change of load from a first to a second load demand, the residual-gas quantity is first provided according to the first load demand, and the fuel quantity is first provided according to the second load demand. In so doing, misfires are avoided. Additional advantages are that, for example, no further correction characteristic diagrams are necessary, and as a result the method proves itself to be very maintenance free.

Furthermore, provision is made in a likewise advantageous manner for a control unit for the operation of an internal combustion engine, wherein the control unit provides at least one operating variable according to the second load demand in the operating cycle, in which a change of load from a first to a second load demand is performed, and wherein the control unit comprises a lag element, which provides a residual-gas quantity according to the first load demand in the operating cycle, in which the change of load occurs.

Advantageous modifications of and improvements in the device, respectively the method, indicated in the independent claim are possible by means of the steps specified in the independent claims.

Provision is made in an additional advantageous embodiment for additional operating variables to be provided according to the second load demand in the operating cycles subsequent to the operating cycle, in which the change of load occurs. This makes it possible to implement the change of load in a non-precipitous manner, which successively distributes said change over at least two operating cycles in order to optimize the activation variables, for example with regard to lowering toxic emissions. In so doing, provision can, however, be made to introduce as before only the fuel quantity according to the second mode of operation in the operating cycle immediately following the change of load.

Provision is made in a further advantageous form of embodiment to activate at least one exhaust valve during a change of load in the operating cycle (k), where the change of load occurs, with the activation variables of the first load demand in an internal combustion engine with variably activated gas exchange valves. In this advantageous manner, a residual-gas quantity is available, which prevents a misfire.

BRIEF DESCRIPTION OF THE DRAWINGS

Examples of embodiment of the invention are depicted in the drawings and are explained in detail in the following description.

The following are shown.

DETAILED DESCRIPTION

The invention is exemplary depicted using an internal combustion engine, in which the fuel is directly injected into the combustion chamber of the internal combustion engine. In principle other methods are, however, conceivable, with which the fuel is made available for the combustion. Particularly an intake manifold fuel injection is also a possibility.

The method is furthermore not limited only to internal combustion engines with a variable valve drive—for example a cam shaft phase setting or an electrohydraulic valve drive—but can also be applied to a valve drive with a fixed phase relationship between the crankshaft and the camshaft, wherein the exhaust gas recirculation then preferably takes place externally.

Figure 1:
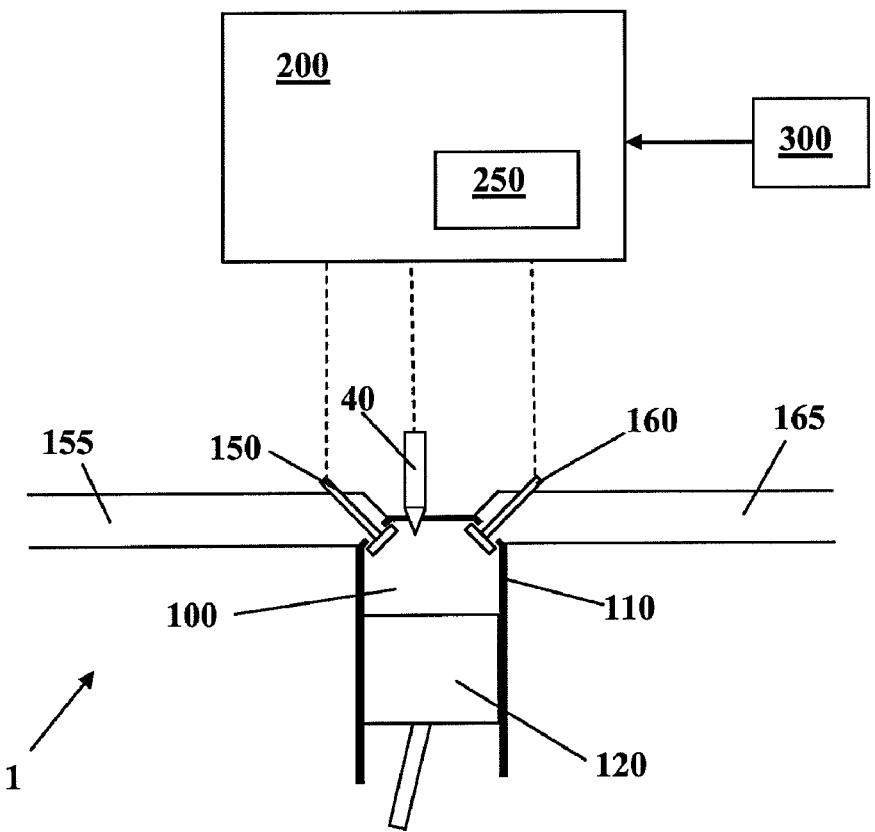
FIG. 1 shows schematically the layout of an internal combustion engine.

An internal combustion engine 1 is schematically depicted in FIG. 1, wherein a cylinder 110 is exemplary depicted with a fuel injection valve. A piston 120 is disposed in the cylinder 110 so that it can move reciprocally. The cylinder has a combustion chamber 100, which is limited among other things by the piston 120, by gas exchange valves, specifically an intake valve 150 and an exhaust valve 160. Provision can also be made for several intake and/or exhaust valves 150, 160. The fuel injection valve 40 projects into the combustion chamber 100 in the region of the intake and exhaust valves 150, 160 and makes a direct introduction of the fuel into the combustion chamber 100 possible. Furthermore, an intake manifold 155 preferably carries air to the intake valve 150, and the air proceeds into the combustion chamber 110 by opening the intake valve 150. Exhaust gases are preferably directed into an exhaust gas pipe 165 by opening the exhaust valve 160. Provision can also alternatively be made in an intake manifold fuel injection system for a fuel injection valve at the intake manifold.

The fuel injection valve 40 as well as the intake and exhaust valve 150, 160 is connected to the control unit 200 via control lines. The components of the internal combustion engine are activated in a manner appropriate to the prevailing mode of operation via the control lines. Changes in torque, respectively new load demands, can, for example, be signaled by the driver via the position of the accelerator pedal or are also, for example, operationally initiated as a result of switching on additional units. The acquisition of one such load demand is depicted in FIG. 1 as an acquisition means 300. The control unit provides new activation variables, respectively operational variables, based on a load demand. Provision is made according to the invention for a lag element 250 in the control unit 200, which delays the supply of at least a portion of the new activation variables, so that the control unit activates the components of the internal combustion engine, and in this instance particularly the fuel injection valve 40 and the gas exchange valves 150, 160, partially with new and partially with old variables.

Figure 2:
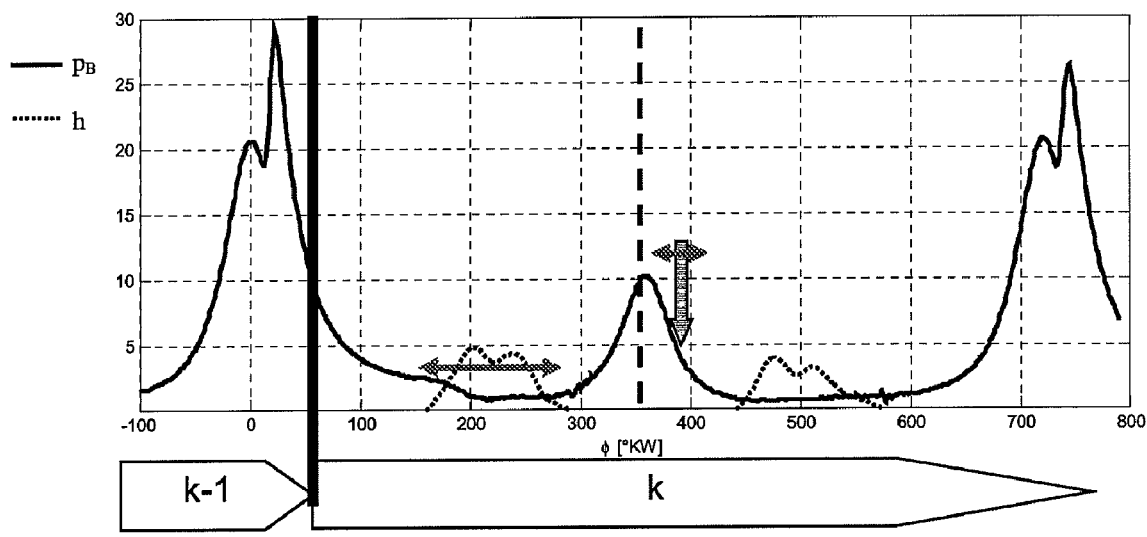
FIG. 2 is a diagram with a combustion chamber pressure curve and a valve lift curve.

A curve of a combustion chamber pressure $p_B$ (solid line) and the valve lifts h of the gas exchange valves (dashed line) is exemplary shown in FIG. 2 in relationship to the angle of crankshaft rotation in a homogenous operation of the internal combustion engine during a controlled self-ignition. An angle of crankshaft rotation from −100 to 800° is depicted above the ordinate, and the combustion chamber pressure and the valve lift are plotted above the abscissa. Top dead center of the ignition ZOT is located at 0° and at 720°, and top dead center during the charge transfer LOT is located at 360°. The charge transfer serves in a known manner to discharge combusted exhaust gases preferably at an angle of crankshaft rotation between 180° and 360° and to draw in fresh air (or if need be a fuel-air mixture in an intake manifold fuel injection) in a range from preferably 360° to 540°. After this a compression stroke follows in a range of crankshaft revolution from 540° to 720°, wherein the fresh air, the fuel and if need be an available residual gas are compressed. In a gasoline engine with direct gasoline injection, the fuel is injected depending on the mode of operation, for example, in the air intake phase and/or also in the compression phase and is ignited approximately around ignition TDC with the aid of a spark plug.

The residual gas can also alternatively be supplied to the combustion chamber with the aid of an external exhaust gas recirculation. In the case of an external exhaust gas recirculation, the residual gas is typically supplied in a controlled manner to the intake manifold via a return line from the exhaust gas side. Other recirculation possibilities are also conceivable.

During an operation of an internal combustion engine and in this instance particularly of a gasoline engine in controlled self-ignition, the fuel is not ignited with the aid of a spark plug but as a result of the temperature buildup of the gases compressed in the combustion chamber. In the following, the invention is explained using such an internal combustion engine, however, without limiting its application to one such internal combustion engine. It is especially conceivable to also implement the procedural approach according to the invention with other internal combustion engines with and without an ignition mechanism and especially with a diesel internal combustion engine and internal combustion engines with an intake manifold fuel injection.

In order to supply a homogenous air-fuel mixture, the fuel is injected, as is shown in FIG. 2, in a region after the gas exchange TDC. In the example depicted, said fuel injection occurs at approximately 380°. Subsequently the intake valve is opened at approximately 450° to 580° so that fresh air can flow into the combustion chamber. The injected fuel is for the most part homogenously distributed in the combustion chamber on account of the movements of the piston and the incoming air. During the compression of the air-fuel mixture, the temperature of the mixture is increased so dramatically that the mixture independently ignites itself.

The point in time, respectively the angle of crankshaft rotation, at which the independent ignition takes place, as well as the injection start and duration is primarily set by the fresh-air quantity, which is drawn into the intake manifold, and the residual-gas quantity, which is retained in or recirculated to the combustion chamber. The parameters for setting these variables and if need be additional variables are typically deposited in characteristic diagrams or also in pilot control maps, for example as a function of a load or torque demand.

The residual-gas mass required for self-ignition increases at low load points/load demands because the exhaust gas temperature drops due to the smaller combusted fuel mass. A smaller residual gas mass is required at higher load demands because the exhaust gases are hotter. The temperature of the residual gas mass remaining in the cylinder, which is dependant on the load, leads to misfires in the dynamic operation during a change from a lower to a higher load; whereas during a change from high to low loads, combustions, which are too early, occur.

Methods known until now are based on a step-by-step adaptation of the residual gas mass during the load step (sudden load variation), respectively change of load. In so doing all of the activation variables—valve times, injected fuel quantity and injection timing—are abruptly switched during the load step (sudden load variation). Misfires are prevented, in that the effects of the residual gas being too hot, respectively too cold, are counteracted by an adaptation of the point of injection time or the valve times. The parameters for avoiding misfires during a change of load are deposited for this reason in correction characteristic diagrams.

The method described here does without such correction characteristic diagrams, which also generally depend on the height of the load step (sudden load variation).

Provision is preferably made according to the invention for lag elements, which switch selected activation variables—for example opening and closing times of the gas exchange valves or the injection times—with a lag cycle.

A first and second operating cycle k−1, k are additionally depicted, wherein the separation of the two operating cycles was arbitrarily set at 60° of crankshaft revolution and of course can be individually set for a respective engine control unit. In the example at hand, the internal combustion engine is situated in the first operating cycle k−1 in a self-igniting operation at the load point A, respectively a load demand A prevails. In the operating cycle k, in a so-called change of load operating cycle k, a step to the load point B is now supposed to take place, i.e. the load (power) B is already supposed to be generated in the change of load operating cycle k. The activation variables prevail in the characteristic diagrams, which are required in the steady-state operation at load point A and B The activation variables from the characteristic diagram or from the pilot control map of load point A are used for the first operating cycle k−1. The activation variables from the characteristic diagram or the pilot control map, which relate to load point A, continue to be used for the subsequent change of load operating cycle k. The fuel mass, however, is already provided with respect to load point B.

Additional parameters, respectively activation variables, with respect to load point B can, however, be provided if necessary. Provision can particularly be made for the point of injection time to also already be used with respect to the new load point B. At least the residual-gas quantity should, however, according to the invention still be provided with respect to the old load point A, so that a sufficient quantity of heat and residual gas is available for the self-ignition in the compression phase and so that misfires can be avoided with certainty.

The residual-gas quantity is provided in an internal exhaust gas recirculation by means of a selective actuation of the exhaust valves. During a change of load according to the invention, the exhaust valves are analogously activated according to the old load demand in order to provide the residual-gas quantity. In this way except for unavoidable pressure and temperature variations in the combustion chamber, always the same residual-gas quantity can essentially be provided when a consistent activation of the valves occurs.

In the case of an external exhaust gas recirculation, the return valve would be accordingly activated.

The invention claimed is:

1. A method of operating an internal combustion engine, wherein a fresh-air quantity, a residual-gas quantity and a fuel quantity are provided as a function of a load demand, the method comprising:
delivering the residual-gas quantity according to a first load demand during a change of load from the first load demand to a second load demand; and
delivering the fuel quantity according to the second load demand during the change of load from the first load demand to the second load demand.

2. A method according to claim 1, wherein one or more additional operating variables are provided according to the second load demand in an operating cycle following a change of a load operating cycle.

3. A method according to claim 2, further comprising:
variably activating a plurality of gas exchange valves of the internal combustion engine; and
retaining the residual-gas quantity in a combustion chamber, independent of the load demand, by a selective activation of at least one exhaust valve, and wherein during a change of load in the change of load operating cycle the activation of the at least one exhaust valve takes place according to the first load demand.

4. A control unit for implementing a method of operating an internal combustion engine, wherein a fresh-air quantity, a residual-gas quantity and a fuel quantity are provided as a function of a load demand, the method comprising:
delivering the residual-gas quantity according to a first load demand during a change of load from the first load demand to a second load demand; and delivering the fuel quantity according to the second load demand during the change of load from the first load demand to the second load demand, wherein during a change of a load operating cycle, the control unit provides at least one operating variable according to the second load demand, the control unit comprising:
a lag element that provides the residual-gas quantity according to the first load demand in the change of the load operating cycle.

* * * * *